US007616972B2

(12) United States Patent  (10) Patent No.: US 7,616,972 B2
Piekarz  (45) Date of Patent: Nov. 10, 2009

(54) HANDS-FREE INSTALLATION FOR MOBILE TELEPHONES AND CONTROL UNIT THEREFOR

(75) Inventor: Roman Piekarz, Mielec (PL)

(73) Assignee: Bury Sp. z.o.o., Mielec (PL)

( * ) Notice: Subject to any disclaimer, the term of this patent is extended or adjusted under 35 U.S.C. 154(b) by 497 days.

(21) Appl. No.: 11/412,050

(22) Filed: Apr. 27, 2006

(65) Prior Publication Data

US 2007/0037551 A1  Feb. 15, 2007

(30) Foreign Application Priority Data

Apr. 26, 2005 (DE) .................. 10 2005 019 661
Aug. 19, 2005 (DE) .................. 10 2005 039 588

(51) Int. Cl.
*H04M 1/00* (2006.01)
(52) U.S. Cl. .............. 455/569.1; 455/569.2; 455/556.1; 455/575.1; 455/575.9
(58) Field of Classification Search .............. 455/556.1, 455/569.1, 345, 90, 575.1, 349, 90.3, 550.1, 455/101, 573, 346, 569.2, 420, 558, 575.9; 700/83
See application file for complete search history.

(56) References Cited

U.S. PATENT DOCUMENTS

| 5,659,887 | A | * | 8/1997 | Ooe | 455/575.9 |
| 5,748,720 | A | * | 5/1998 | Loder | 455/406 |
| 5,857,151 | A | * | 1/1999 | Heinonen et al. | 455/321 |
| 5,918,189 | A | * | 6/1999 | Kivela | 455/575.1 |
| 6,058,298 | A | * | 5/2000 | Stamegna | 455/345 |
| 7,392,059 | B2 | * | 6/2008 | White et al. | 455/550.1 |
| 2003/0083115 | A1 | * | 5/2003 | Kato | 455/573 |
| 2006/0014571 | A1 | * | 1/2006 | Gordeyev | 455/569.1 |
| 2006/0073796 | A1 | * | 4/2006 | Collavo et al. | 455/116 |
| 2006/0252457 | A1 | * | 11/2006 | Schrager | 455/556.1 |
| 2007/0042809 | A1 | * | 2/2007 | Angelhag | 455/569.1 |
| 2007/0082665 | A1 | * | 4/2007 | Piekarz | 455/426.1 |
| 2007/0142095 | A1 | * | 6/2007 | Bollmann et al. | 455/569.2 |
| 2008/0103612 | A1 | * | 5/2008 | Bergmann et al. | 700/83 |

FOREIGN PATENT DOCUMENTS

| DE | 101 00 824 A1 | 1/2001 |
| DE | 101 31 169 A1 | 6/2001 |
| DE | 103 10 115 A1 | 3/2003 |

* cited by examiner

*Primary Examiner*—Tan Trinh
(74) *Attorney, Agent, or Firm*—Whitham Curtis Christofferson & Cook, PC

(57) ABSTRACT

A hands-free installation for mobile telephones, having a holder (2) which has a contact unit and which uses a contact unit to set up a connection to a mobile telephone and which is connected to a central device to which external devices can be connected allows convenient handling without the central device being in a form which has an individual telephone transmission and reception unit by virtue of a control unit (1) being able to be inserted into the holder (2), said control unit having an identification device for SIM data from the mobile telephone and an individual telephone transmission and reception unit and being able to be connected by means of the contact unit in the holder (2) to a power supply and to the external devices which can be connected to the central device.

20 Claims, 5 Drawing Sheets

Figure 1:
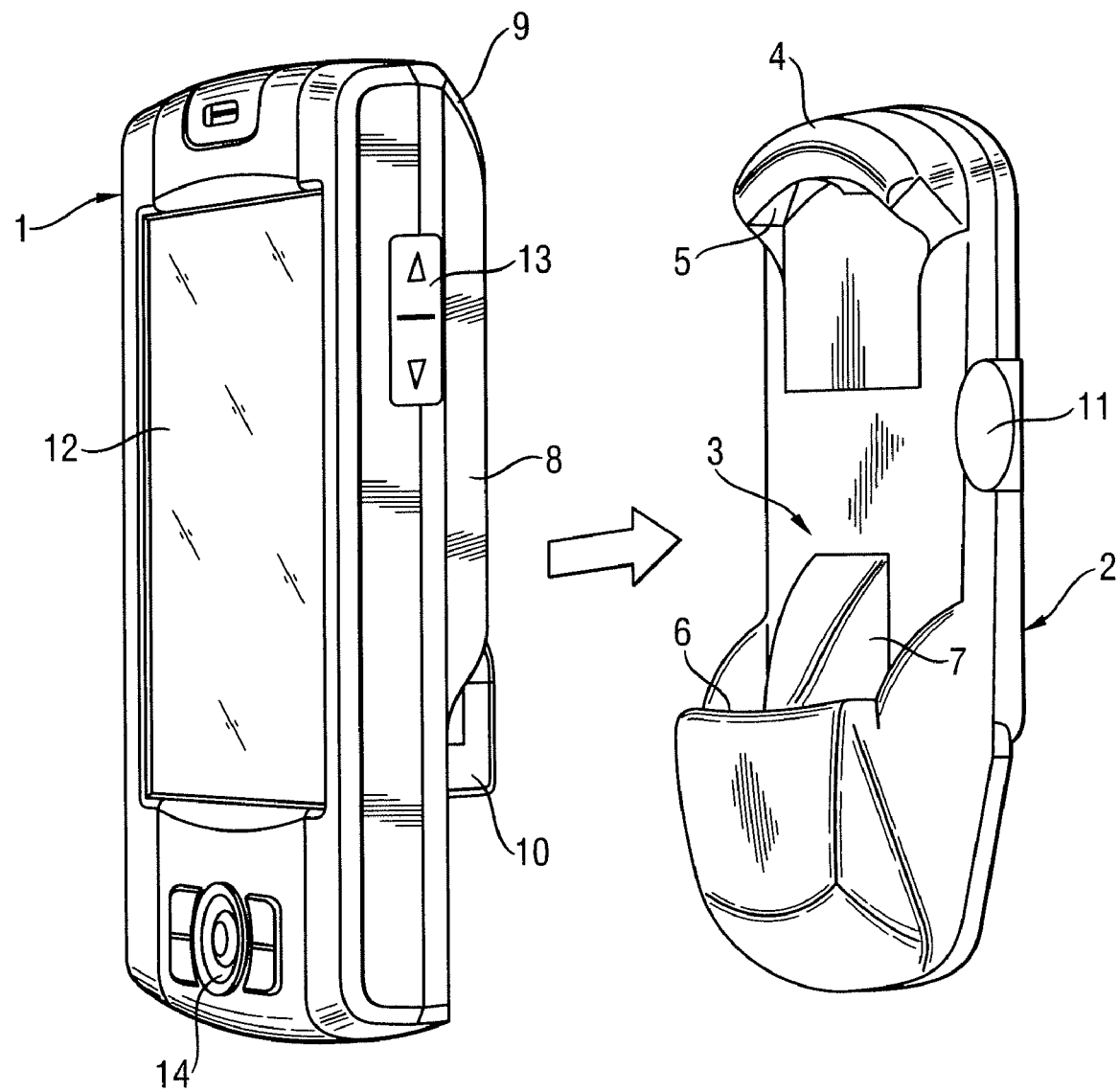

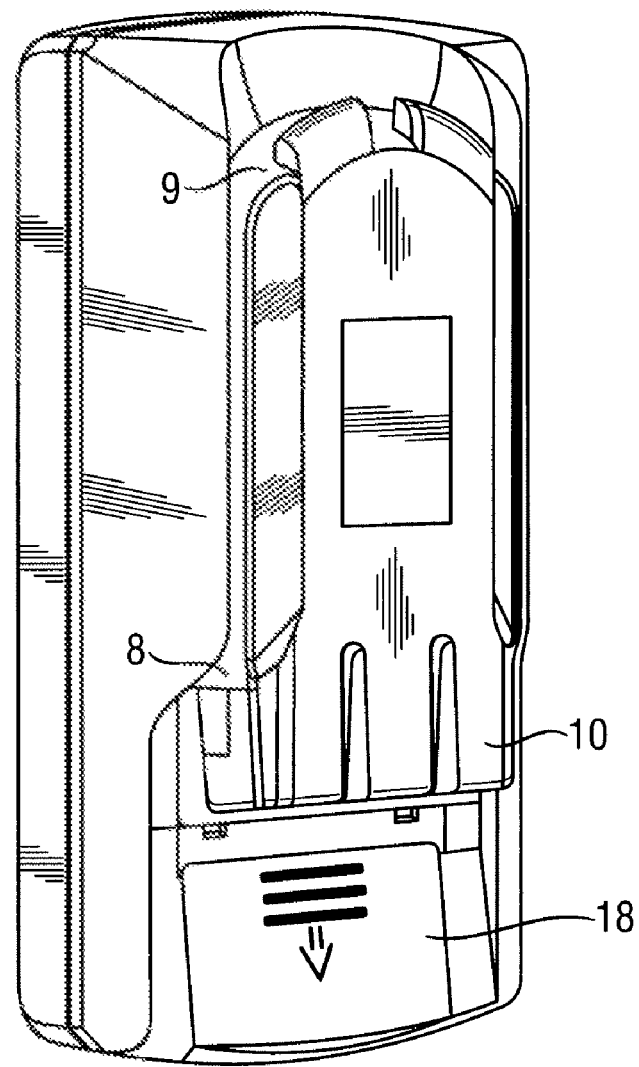
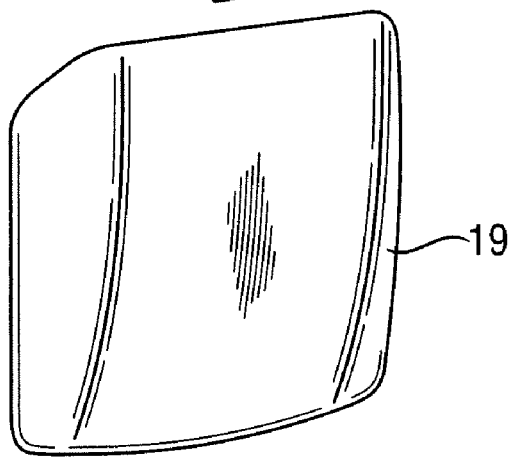
Fig. 3

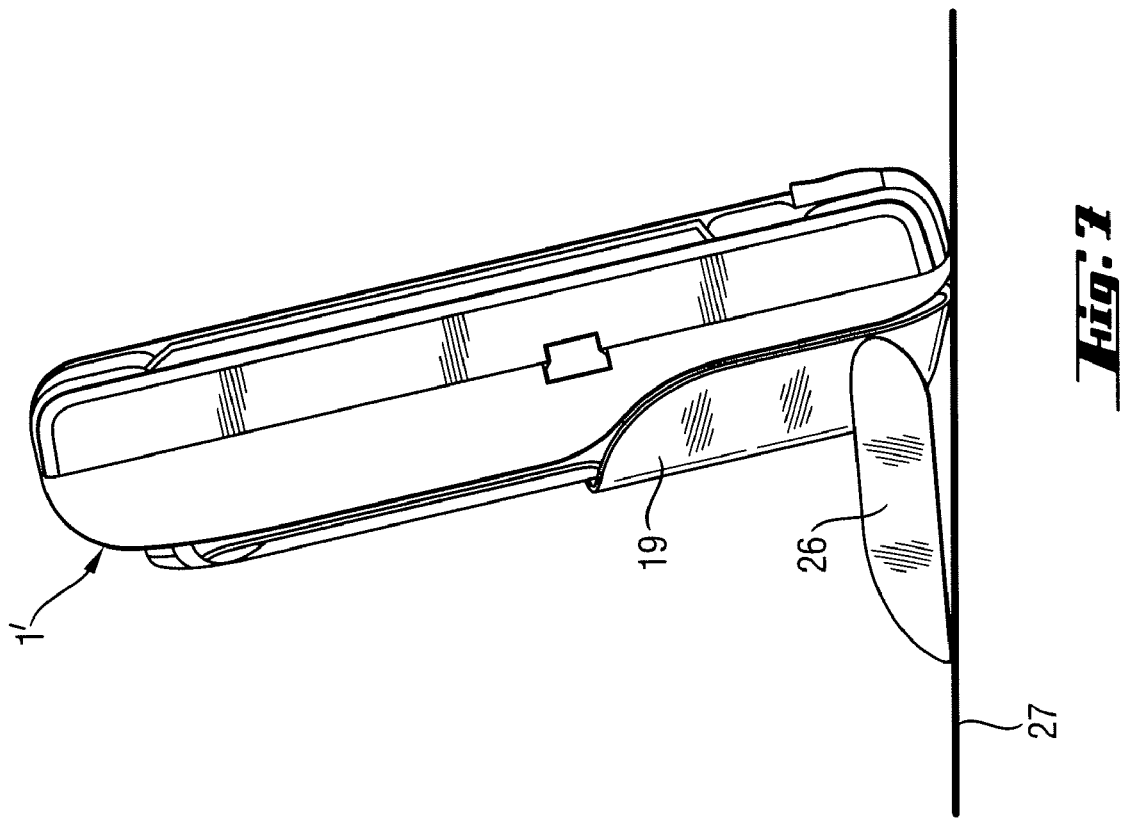
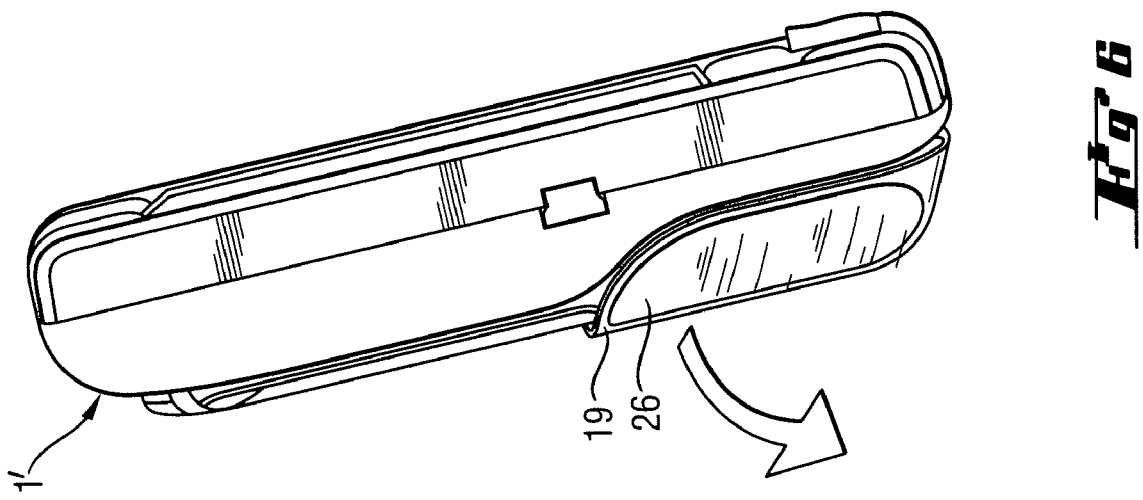

HANDS-FREE INSTALLATION FOR MOBILE TELEPHONES AND CONTROL UNIT THEREFOR

The invention relates to a hands-free installation for mobile telephones, having a holder which has a contact unit and which uses the contact unit to set up a connection to a mobile telephone and which is connected to a central device to which external devices can be connected. The invention also relates to a control unit for a hands-free installation of this kind.

Hands-free installations such as are used particularly in motor vehicles are generally installed permanently in the vehicle and connected to a suitable vehicle antenna, a loudspeaker and possibly to a microphone and possibly other control devices (e.g. for muting a radio during a telephone call). In this case, the hands-free device includes a holder which is visible from the vehicle interior and whose contact unit can be used to set up the connection to an external mobile telephone. Since different mobile telephone types are in use, it is usual with customary systems to use specific pocket-like telephone holders which match the mobile telephones and which can hold and make contact with the mobile telephones. These telephone holders therefore specifically match one mobile telephone type on the holding side, whereas on the other hand a universal contact unit is provided which is able to interact with the contact unit in the holder fitted in the car. Hence, different mobile telephone types can be connected to the hands-free device permanently installed in the vehicle by virtue of appropriate different telephone holders being used as adapters. Hence, the contact unit and mechanical design of these telephone holders are such that all the different telephone holders can interact mechanically and electrically with the same holder.

Since mobile telephones are frequently provided with a wireless data communication device, regularly on the basis of the Bluetooth standard, a Bluetooth communication link of this type between the mobile telephone and the hands-free device has been used in order to conduct a telephone call on the mobile telephone using the loudspeaker and the microphone of the hands-free device. The telephone call is transmitted from the telephone to the hands-free device via the data communication device, specifically both with regard to the audio link and with regard to the controller. An installation of this type has the advantage that the mobile telephone no longer needs to be plugged into a telephone holder, but rather can remain in the user's pocket, for example, since the connection to the hands-free device permanently installed in the car is made wirelessly. A drawback in this context, however, is that during the call the wireless communication link needs to be maintained at a high utilization level, so that this results in a high power requirement for the telephone. In this case, charging the telephone, for example using a cable connected to a cigarette lighter, is indispensable. A further drawback is that the transmission power needs to be provided by the mobile telephone and that the mobile telephone uses the individual built-in antenna for sending and receiving, which results in a high radiation load within the vehicle and often means poorer reception. It is therefore known practice to provide these installations, too, with a holding apparatus which can be used to charge the mobile telephone and possibly also to provide a connection to an external antenna.

When vehicles are equipped for the first time, it is also known practice to provide a hands-free device with which the mobile telephone communicates via the wireless communication link only in respect of the data from the SIM card (identification and data stored on the SIM card, such as telephone books, received SMSs etc.) on the basis of the "rSAP" (remote SIM access profile) standard. In this case, only the Bluetooth link with a relatively low power consumption is active in the mobile telephone, while the more power-intensive functions, such as transmission and reception of the telephone call or of a data signal transmission via the telephone network, are turned off. Accordingly, the hands-free device permanently installed in the vehicle needs to be more or less in the form of a full telephone. This has the drawback that complex installation in the vehicle is required and that the hands-free device has a more or less full telephone installed in it which can be used only together with the vehicle.

The present invention is based on the object of allowing convenient use of a mobile telephone with a built-in hands-free installation without needing to install a full telephone device for the hands-free installation.

The invention achieves this object with a hands-free installation of the type mentioned at the outset by virtue of a control unit being able to be inserted into the holder, said control unit having an identification device for SIM data from the mobile telephone and an individual telephone transmission and reception unit and being able to be connected by means of the contact unit in the holder to a power supply and to the external devices which can be connected to the central device.

Preferably, the control unit in this case contains a wireless data communication device for setting up a direct wireless communication link to a mobile telephone which has an appropriate data communication device.

The inventive control unit allows convenient use of the mobile telephone by virtue of the mobile telephone no longer needing to be physically connected to the hands-free installation—that is to say plugged into a holder, for example. The telephone call is conducted using the control unit in conjunction with the hands-free installation instead of using the mobile telephone, the control unit not being a fixed part of the hands-free installation. Rather, the control unit can be inserted into a holder such as has become known and has been used for holding holders which are specific to mobile telephones. This allows the control unit to be removed from a vehicle and used in another vehicle which has an ordinary hands-free installation i.e. without Bluetooth operation, installed in it. The control unit can therefore be used instead of a previously ordinary holder for a mobile telephone. A holder matching a mobile telephone is not required in line with the invention.

The control unit may preferably have a display for inputting control instructions, the display being able to extend almost over an entire surface of the control unit in order to allow convenient display operation. In this context, the size of the display is preferably more than ⅔ of a large surface of the control unit.

The control unit's internal identification device for the SIM data from the mobile telephone can be connected to the data communication device, so that the SIM data are transmitted by the wireless data communication link. The control unit is then activated for as long as the associated mobile telephone is in the direct wireless communication link to the control unit. If the mobile telephone is taken to a greater distance from the control unit, so that the wireless communication link disconnects, the control unit turns off and the mobile telephone works—outside the vehicle—in conventional fashion.

However, it is also possible to design the identification device for the SIM data from the mobile telephone as an individual SIM card reader, for example in order to be operated with a twin card for the mobile telephone's SIM card. In this case, the control unit can be operated with the data from the mobile telephone even when the mobile telephone itself is not in a radio range.

The control unit can preferably be inserted and locked into the holder by means of latching and can therefore easily be removed again by unlocking it. This makes it a particularly simple matter to achieve the advantages of the invention.

An inventive control unit of the type mentioned at the outset is characterized in that the control unit is designed for direct insertion into the holder and for making contact with the contact unit in the holder using an appropriate contact unit, in that it has an identification device for SIM data from a mobile telephone and an individual telephone transmission and reception unit and can be connected by means of the contact unit in the holder to a power supply and to the external devices which can be connected to the central device. Preferably, the control unit can be used as a full mobile telephone after being removed from the holder.

The present invention therefore allows the control unit, which is designed as a universal control unit for a hands-free device which (control unit) can be plugged into the holder, to be used as a separate second telephone for a mobile telephone whose SIM data are transmitted to the control unit wirelessly via a Bluetooth link or preferably by means of a second SIM card for the same SIM data.

In certain designs, it may be expedient if the control unit is provided with an additional part which can be connected to the control unit in order to cover the contact unit on the control unit. This allows the otherwise outwardly open contacts on the contact unit to be covered and allows the control unit's housing to have the additional part added to it to form a completely handleable housing for the mobile telephone, which can be used separately outside the holder.

In this context, the additional part may contain at least one functional part which is added to the control unit to form a full mobile telephone. An additional part of this type is an antenna for sending and receiving the telephone calls, for example. In comparison with an antenna which is incorporated in the control unit itself, the antenna incorporated in the additional part provides the advantage that this antenna is activated only when the control unit has been removed from the holder. When the control unit is inserted into the holder, it is connected to the external antenna, for example the car antenna, via the hands-free installation's central device. Accordingly, there is no need to change over between an internal antenna situated in the control unit and the antenna which is connected to the central device when the control unit is inserted into the holder.

The additional part can also contain, as a functional part, a storage battery which provides a power supply for the control unit alone if the control unit does not have an individual storage battery, or the control unit's power supply is assisted by the individual storage battery following the removal of the control unit from the holder. The storage battery accommodated in the control unit provides the advantage that it can be continually charged by means of the power supply connected by the connection to the central device, for example in the motor vehicle, when the control unit is inserted into the holder.

The inventive control unit is preferably itself provided with a microphone and a loudspeaker, although the microphone and loudspeaker may also be arranged in the additional part.

The additional part may also be equipped with an input keypad for the control unit so that the control unit can be used independently of the mobile telephone. Since the control unit is preferably equipped with a display, particularly a large-area display, which extends virtually over the entire front of the control unit, the display may also be designed, preferably in the form of a touch screen, for inputting data and/or instructions.

The control unit can preferably be inserted and locked into the holder by means of latching and can therefore easily be removed again by unlocking it, so that it can then be used as a full mobile telephone if appropriate.

Furthermore, the additional part completing the control unit may perform the function of a stand for the control unit so that when the control unit with the additional part has been removed from the holder it can be stood on a flat plate. Preferably, the additional part is provided with a housing part which can be folded out such that after the housing part has been folded out the previously non-existent stand function is ensured.

Figure 2:
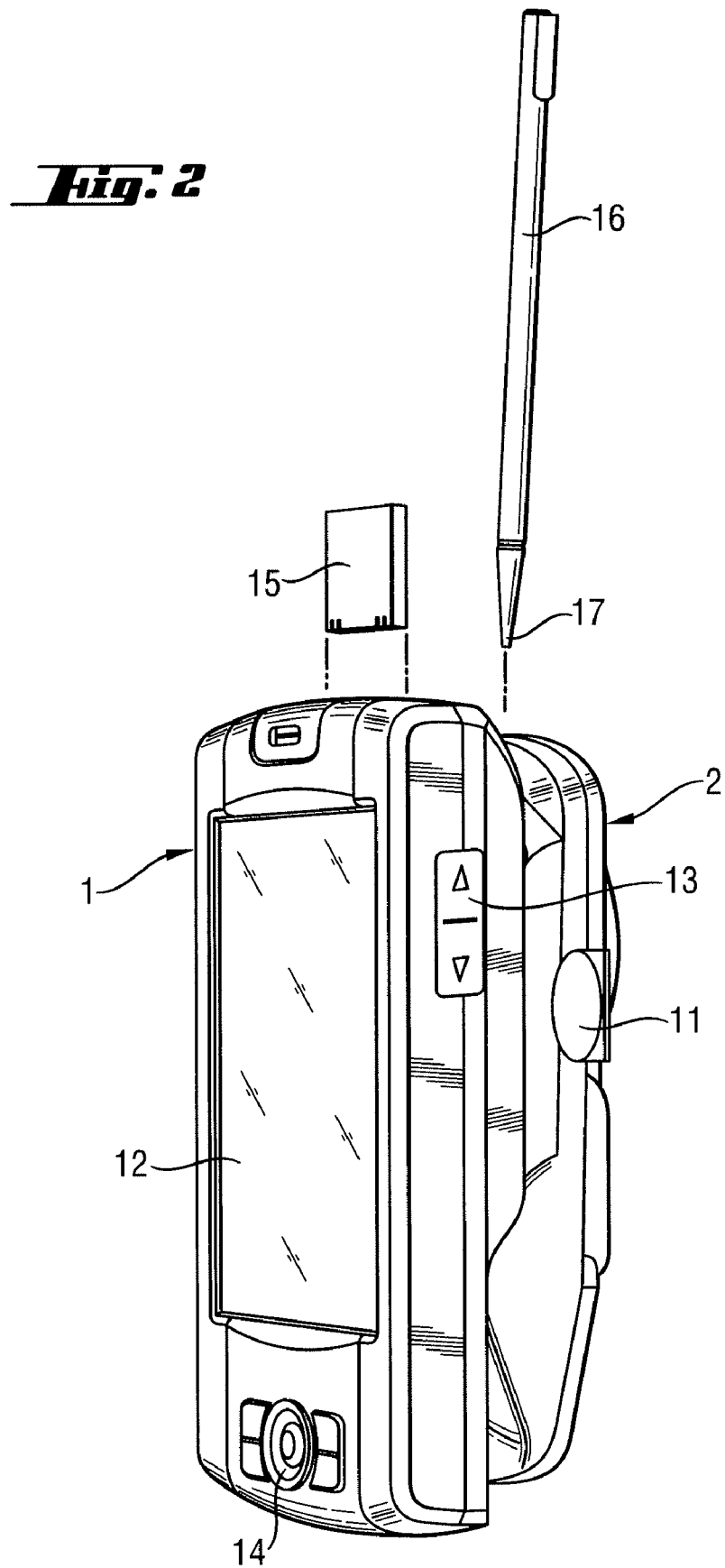
Figure 5:
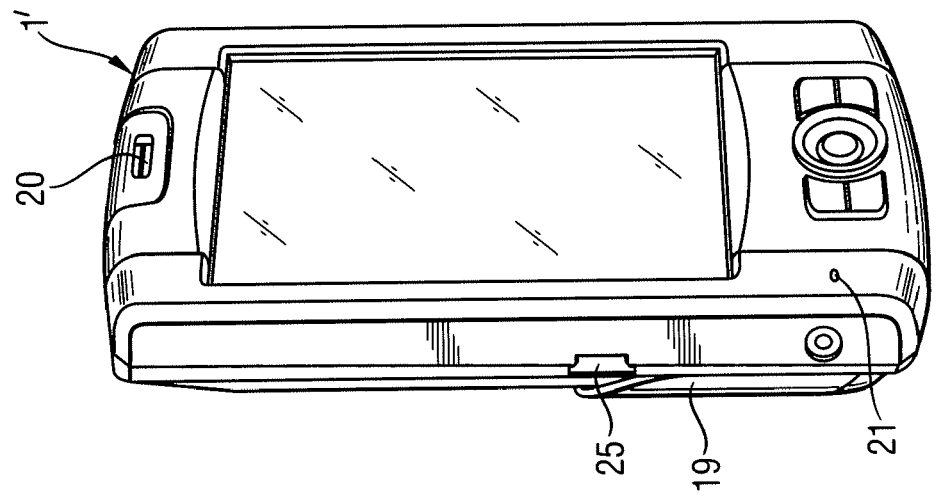
Figure 4:
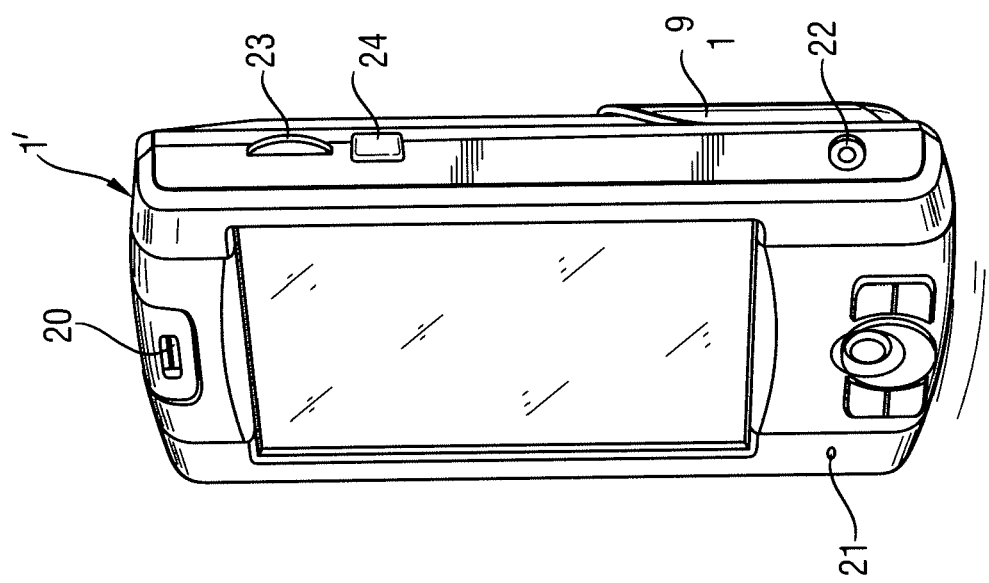

The invention will be explained in more detail below with reference to an exemplary embodiment which is shown in the drawing, in which:

FIG. 1 shows a perspective view, diagonally from the front, of an inventive control unit in front of a holder installed in a vehicle, FIG. 2 shows the arrangement shown in FIG. 1 with the control unit inserted in the holder, FIG. 3 shows a perspective view, diagonally from the back, of the control unit shown in FIG. 1 when it has been removed from the holder, with an additional part added to the control unit, FIG. 4 shows a perspective view, diagonally from the front right, of a further exemplary embodiment of an inventive control unit with a fitted additional part, FIG. 5 shows a perspective view of the control unit shown in FIG. 4, diagonally from the front left, FIG. 6 shows a side view of a further exemplary embodiment of an inventive control unit with a fitted additional part, FIG. 7 shows a side view as shown in FIG. 6 with a housing part which has been folded out from the additional part and which causes the additional part to act as a stand for the control unit at the same time.

An inventive control unit 1 is in a form such that it can interact mechanically and electrically with a holder 2 installed in a vehicle.

The holder 2 is designed to have a holding space 3 limited at the top by a terminating wall 4 which can be moved upwards and which has a section 5 projecting in the form of a hook. The holding space 3 is bounded at the bottom by a pocket-like formation 6 which contains a blocking element 7 which can be moved downwards after unlocking. After it has been moved, the blocking element 7 releases a contact unit arranged in the pocket-like formation 6.

Correspondingly, the back of the control unit 1 is provided with an attachment 8 whose top has an undercut groove 9 and whose bottom has a projection 10 provided with a (covered) contact unit. The control unit 1 can therefore be inserted into the holder 2 by moving the upper wall 4 of the holder upwards with the undercut groove at the top end of the attachment 8 in order to be able to insert the bottom end 10 into the holding space 3. By moving the control unit 1 downwards, the upper wall 4 is moved back into the initial position and is locked there. At the same time, the blocking element 7 is moved and the contact units (which are of complementary design with respect to one another) on the control unit 1 and the holder 2 make contact with one another. The mounted position of the control unit 1 and the holder 2 is shown in FIG. 2. The control unit 1 can be removed from the holder 2 after unlocking using an unlocking key 11 by first of all moving the upper wall 4 upwards with the control unit 1, which releases the attachment 10 from the pocket-like formation 6 of the holder 2.

The front of the control unit 1 is provided with a large-area display 12 which is used for inputting data using a menu guide. To this end, the display may also be in the form of a touch screen.

A side wall of the control unit 1 holds a control rocker 13 which can be used to control particularly the volume of reproduction on the motor vehicle's loudspeaker connected to the hands-free device or on a loudspeaker which is incorporated in the control unit 1.

Below the display 12 there is a control device 14 which allows cursor control and clicking on selection elements shown on the display 12.

FIG. 2 also clarifies that the control unit 1 is provided for holding a memory card 15, that is to say has an appropriate holding slot and a memory card reader.

In addition, the housing of the control unit 1 is provided with a receptacle for a stylus 16 whose tip 17 allows input on the display 12 in the form of a touch screen.

The back of the control unit 1, shown in FIG. 3, reveals that below the projection 10 there is a compartment 18 for a storage battery which can be charged via the contact arrangement covered by the projection 10 and via the holder by connecting it to the motor vehicle's power source. The compartment 18 may also contain a holding device (not shown) for a SIM card below the storage battery in a manner which is known per se.

The lower section of the housing of the control unit 1 on the back is formed by a recess in order to match it to the corresponding lower projection on the holder 2. This recess can be filled by an additional part 19 which can be pushed onto the housing of the control unit 1 from below and can be latched onto it. In the simplest case which is shown here, the additional part 19 is provided with a mobile radio antenna (GSM antenna) which can be connected using the contact arrangement of the control unit 1. In the exemplary embodiment shown, the control unit is provided with an individual microphone and an individual loudspeaker and can also be actuated directly using the display 12 in the form of a touch screen. Accordingly, this control unit is already being complemented to form a full mobile telephone by the additional part 19 provided with the mobile radio antenna. The control unit 1 is therefore able, following insertion of the SIM card, which may also be a separate SIM card, to be used as a fully independent individual mobile telephone when it has the additional part 19 added to it following removal from the holder 2. This produces a useful further opportunity for use for the control unit, initially designed just for controlling the hands-free device, with the optionally available additional part 19.

The further exemplary embodiment of a control unit 1' which is shown in FIGS. 4 and 5 illustrates that the control unit may be equipped with numerous further functions, for example from a PDA (Personal Digital Assistant).

In particular, the control unit 1' is provided with a loudspeaker 20 and a microphone 21, which can preferably be turned off when the control unit 1' is inserted into the holder 2.

The control unit 1' also reveals further connections and control elements, for example a connection 22 for a set of headphones which allows a telephone call to be conducted with the control unit 1' using external headphones with a microphone. In addition, an adjusting wheel 23 can be seen which allows the reproduction volume on the loudspeaker 20 to be adjusted. A key 24 also allows a dictation function (recording) to be controlled.

In addition, the control unit 1' is equipped with a connection 25, preferably in the form of a mini-USB connection, for transmitting data. This allows, by way of example, address data and telephone numbers stored on a PC or similar appliance to be transmitted to the control unit 1', so that they are available in the telephone book on the control unit 1', for example, without needing to be input into the control unit 1' separately. It goes without saying that any other extensions of the control unit 1' are conceivable in order to allow convenient applications of the control unit 1' after the control unit 1' has been removed from the holder 2.

In the exemplary embodiment shown in FIGS. 6 and 7, the additional part 19 has been put onto the control unit 1', as is also illustrated in FIGS. 3 to 5. However, the additional part 19 has a housing part 26 which can be folded out downwards and which can be pivoted about an axis of rotation situated on the lower end of the additional part 19—and hence of the control unit 1'—in the direction of the arrow shown in FIG. 6.

FIG. 7 shows the housing part 26 in the pivoted-out state, in which the housing part 26 and the additional part 19 form a stand for the control unit 1' which allows the control unit 1' to be stood on a flat base 27. The stability of the stand 19, 26 formed in this way is achieved either by virtue of the housing part 26 being mounted tightly in the additional part 19, so that it cannot be folded back onto the additional part 19 by the weight of the control unit 1', or by virtue of the folding-out movement of the housing part 26 being made into a latching position which is formed by an ordinary latching mechanism, for example in the form of a suitable curved control track in combination with a control cam which can move on the curved control track under spring loading, or the like.

The invention claimed is:

1. Hands-free installation for a mobile telephone comprising:
    a central device which is adapted to be contacted by external devices;
    a holder having a contact unit, connected to the central device; and
    a control unit is provided for separate from the mobile telephone and is adapted to be removably inserted into the holder, thereby contacting the contact unit, said control unit including its own telephone transmission and reception unit, the control unit having an identification device for SIM data from the mobile telephone transferred from the mobile telephone into the control unit, and the control unit is adapted to be connected to external devices through the central device by means of the contact unit in the holder.

2. Hands-free installation according to claim 1, characterized in that the control unit has a wireless data communication device for setting up a direct wireless communication link to a mobile telephone which has an appropriate data communication device.

3. Hands-free installation according to claim 1, characterized in that the control unit has a display for inputting control instructions.

4. Hands-free installation according to claim 1, characterized in that the identification device for the SIM data from the mobile telephone is connected to the data communication device.

5. Hands-free installation according to claim 1, characterized in that the identification device for the SIM data from the mobile telephone is an individual SIM card reader.

6. Hands-free installation according to claim 1, characterized in that the control unit can be inserted and locked into the holder by means of latching.

7. Control unit for a hands-free installation for a mobile telephone comprising:
    a telephone transmission and reception unit;
    an identification device for SIM data; and a holder which is provided with a contract unit and which is connected to a central device to which external devices can be connected, wherein the control unit is designed to be removably inserted into the holder thereby making contact with the contact unit in the holder, the identification device receiving SIM data transferred from the mobile telephone, and wherein the control unit can be connected by means of the contact unit in the holder to a power supply and to the external devices which can be connected to the central device.

8. Control unit according to claim 7, characterized in that it can be used as a full mobile telephone after being removed from the holder.

9. Control unit according to claim 7, characterized in that it has an additional part which can be connected to the control unit in order to cover the contact unit on the control unit.

10. Control unit according to claim 9, characterized in that the additional part contains at least one functional part which is added to the control unit to form a full mobile telephone.

11. Control unit according to claim 10, characterized in that the additional part contains at least one antenna.

12. Control unit according to claim 9, characterized in that the additional part additionally contains a chargeable storage battery as a separate power supply for the control unit.

13. Control unit according to claim 9, characterized in that the additional part is also equipped with an input keypad for the control unit.

14. Control unit according to claim 9, characterized in that the additional part has a housing part which can be folded out such that folding it out causes the additional part to act as a stand.

15. Control unit according to claim 7, characterized in that it itself is provided with a storage battery which can be charged by the power supply.

16. Control unit according to claim 7, characterized in that it has a display for inputting control instructions.

17. Control unit according to claim 16, characterized in that the display is in the form of a touch screen for inputting data and/or instructions.

18. Control unit according to claim 7, characterized in that the identification device for the SIM data from the mobile telephone is in an additional SIM card reader.

19. Control unit according to claim 7, characterized in that it can be inserted and locked into the holder by means of latching.

20. Control unit according to claim 7, characterized in that the additional part is in the form of a stand.

* * * * *